US011576241B2

(12) United States Patent
Pahlevaninezhad et al.

(10) Patent No.: US 11,576,241 B2
(45) Date of Patent: Feb. 7, 2023

(54) LED APPARATUS WITH INTEGRATED POWER SUPPLY AND A METHOD OF EMPLOYING SAME

(71) Applicant: 10644137 CANADA INC., Calgary (CA)

(72) Inventors: Majid Pahlevaninezhad, Calgary (CA); Sam Scherwitz, Calgary (CA)

(73) Assignee: 10644137 CANADA INC., Calgary (CA)

( * ) Notice: Subject to any disclaimer, the term of this patent is extended or adjusted under 35 U.S.C. 154(b) by 0 days.

(21) Appl. No.: 17/148,284

(22) Filed: Jan. 13, 2021

(65) Prior Publication Data

US 2021/0131622 A1 May 6, 2021

Related U.S. Application Data

(63) Continuation of application No. 16/496,406, filed as application No. PCT/CA2018/050346 on Mar. 22, 2018, now Pat. No. 10,907,778.

(Continued)

(51) Int. Cl.
*H05B 45/46* (2020.01)
*F21K 9/00* (2016.01)
(Continued)

(52) U.S. Cl.
CPC ............... *H05B 45/46* (2020.01); *F21K 9/00* (2013.01); *F21S 2/005* (2013.01); *H05B 33/00* (2013.01);
(Continued)

(58) Field of Classification Search
CPC ......... F21S 2/005; H05B 45/30; H05B 45/00; H05B 47/19; H05B 33/00; H05B 45/46;
(Continued)

(56) References Cited

U.S. PATENT DOCUMENTS 6,095,661 A 8/2000 Lebens et al.
2015/0035441 A1 2/2015 Hasegawa et al.
(Continued)

FOREIGN PATENT DOCUMENTS

CA 2860134 A1 2/2015
CA 2874151 A1 6/2015
(Continued)

OTHER PUBLICATIONS

International Search Report and Written Opinion issued in corresponding Application No. PCT/CA20181050346,, International Search Report issued in corresponding Application No. PCT/CA20181050346,, dated Jun. 27, 2018, 2, 2018.
(Continued)

*Primary Examiner* — Daniel D Chang
(74) *Attorney, Agent, or Firm* — Chamberlain, Hrdlicka, White, Williams & Aughtry

(57) ABSTRACT

A Light-Emitting Diode (LED) apparatus has a power source outputting a source DC power at a source DC voltage, a plurality of LEDs drivable at a driving DC voltage lower than the source DC voltage, and an electrical path connecting the power source to each LED for powering the LED by the power source. Each electrical path comprises a first portion connected to the power source at the source DC voltage and a second portion connected to the LED at the driving DC voltage, and the length of the first portion is longer than that of the second portion.

21 Claims, 10 Drawing Sheets

Related U.S. Application Data

(60) Provisional application No. 62/475,049, filed on Mar. 22, 2017.

(51) Int. Cl.
  *F21S 2/00* (2016.01)
  *H05B 33/00* (2006.01)
  *H05B 45/00* (2022.01)
  *H05B 47/19* (2020.01)
  *H05B 45/30* (2020.01)

(52) U.S. Cl.
  CPC ............ *H05B 45/00* (2020.01); *H05B 45/30* (2020.01); *H05B 47/19* (2020.01)

(58) Field of Classification Search
  CPC .. F21K 9/00; H02M 3/00; G09G 3/32; G09G 2300/026; G09G 2330/02; G09G 3/12; G09G 2370/02; G09G 2330/021; G09G 2370/16; G06F 3/1446; Y02B 20/30; G09F 9/33
  See application file for complete search history.

(56) References Cited

U.S. PATENT DOCUMENTS

| | | |
|---|---|---|
| 2016/0293069 A1 | 10/2016 | Kido et al. |
| 2017/0311407 A1 | 10/2017 | Chen |
| 2018/0177026 A1* | 6/2018 | Bowser ................. H05B 45/12 |
| 2018/0242422 A1* | 8/2018 | Choi ...................... H05B 45/20 |

FOREIGN PATENT DOCUMENTS

| | | |
|---|---|---|
| CN | 203523088 U | 4/2014 |
| EP | 2533608 A1 | 12/2012 |
| WO | 2017/036087 A1 | 3/2017 |

OTHER PUBLICATIONS

CAT4201/D: 350 mA High Efficiency Step Down LED Driver; ON Semiconductor; Semiconductor Components Industries, LLC; Sep. 2015.

Extended European Search Report issued in corresponding European Application No. 18771903.4, dated Oct. 7, 2020.

* cited by examiner

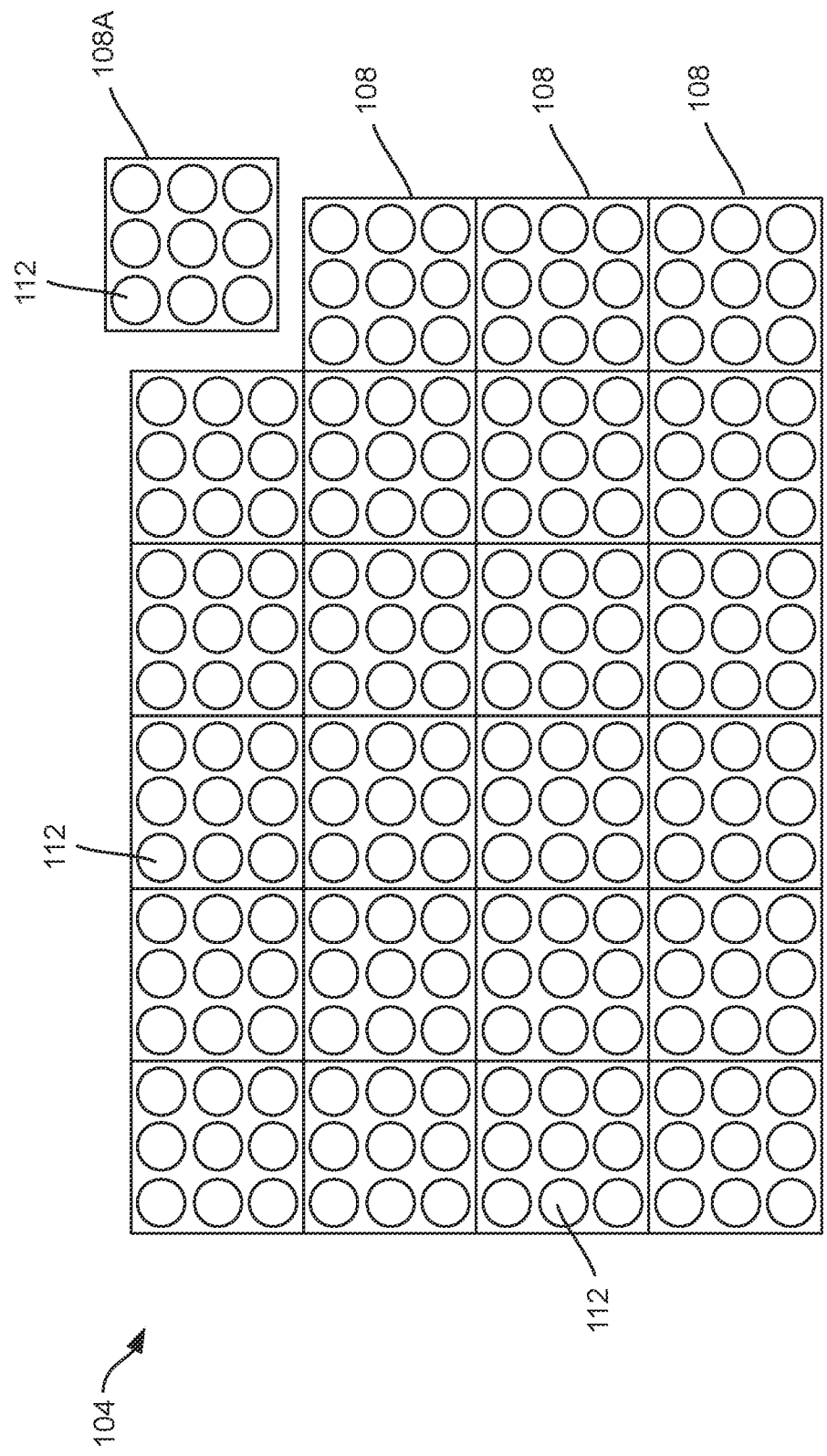

LED APPARATUS WITH INTEGRATED POWER SUPPLY AND A METHOD OF EMPLOYING SAME

CROSS-REFERENCE TO RELATED APPLICATIONS

This application is a continuation of U.S. patent application Ser. No. 16/496,406, with a Filing or 371(c) Date of Sep. 20, 2019, which is a national phase application of PCT Patent Application Serial No. PCT/CA2018/050346 filed Mar. 22, 2018, and claims the benefit of U.S. Provisional Patent Application Ser. No. 62/475,049 filed Mar. 22, 2017, the content of which is incorporated herein by reference in its entirety.

FIELD OF THE DISCLOSURE

The present disclosure relates to Light-Emitting Diode (LED) apparatuses and systems, and in particular to a LED apparatus and system with power supply, and methods of controlling and powering the LEDs thereof.

BACKGROUND

Light-Emitting Diodes (LEDs) are known and have been widely used in industries, mostly as low-power light indicators. In recent years, LEDs with increased power output or increased luminous intensity have been developed and used for illumination. LED lights provide improved energy efficiency, safety, and reliability, and are replacing other types of lights in the market such as incandescent lights, Compact Fluorescent Lamps (CFLs), and the like. As everyday lighting significantly contributes to the burden on power grids and greatly increases the overall requirements for electricity generation, the energy efficiency of LEDs will play a crucial role in future energy savings. It is likely that LEDs will dominate the lighting markets because of their superior energy efficiency.

LEDs with increased power output or increased luminous intensity have also been used for image/video displays such as digital signage and the like. Digital LED signage is a fast-growing industry due to the increasing demand for marketing, advertising, and the like.

Prior-art digital LED signage displays utilize separate power conversion units along with LED drivers to provide electrical power to the LEDs from an external power source such as a power grid. While external power sources usually output alternate-current (AC) power, LEDs generally require direct-current (DC) power. Consequently, the power conversion unit of a digital LED signage requires both an AC-to-DC (AC/DC) converter and a DC-to-DC (DC/DC) converter to convert the AC input power from the external power source into DC power suitable for LEDs. Such converters, however, are usually bulky and heavy. Moreover, they usually produce significant amounts of heat and thus need suitable cooling means such as fans or large heat-sinks for heat dissipation. A well-designed thermal management system is essential to a power conversion unit for LEDs.

FIG. 1 shows an example of a prior-art LED signage display 10. As shown, the LED signage display 10 comprises one or more LED display modules 12 having a plurality of LEDs for display, and a cabinet 14 for accommodating various electrical components of the LED signage display 10 such a power converter, a central controller, and the like. The LED display modules 12 are connected to the electrical components in the cabinet 14 via one or more cables (not shown). In this example, the LED display module 12 is physically coupled to the cabinet 14. However, those skilled in the art will appreciate that, in some prior-art LED signage displays 10, the LED display modules 12 may be physically separated from the cabinet 14.

FIG. 2A is a schematic diagram of the commonly available LED signage 10. As shown, the LED display module 12 of the LED signage 10 is electrically connected to a power converter 18 and a central controller 20 in the cabinet 14 via one or more cables 16A and 16B. In other words, the power converter 18 and a central controller 20 are physically separated from the LED display module 12 and are electrically connected thereto via the cables 16A and 16B.

The LED display module 12 comprises one or more LED drivers 22 driving a plurality of LEDs 24 which are usually arranged in a matrix form having one or more rows and one or more columns. Each LED 24 may be a single-color LED that only emits a single-color light such as a red, green, or blue light, or a multi-color LED such as a tri-color LED that can selectively emit multiple colored lights such as red, green, and blue lights. If single-color LEDs are used, the single-color LEDs may be grouped into one or more LED sets with each LED set comprising a red, green, and blue LEDs arranged in close proximity with each other, thereby forming a pixel of the LED display module 12. On the other hand, if tri-color LEDs are used, each tri-color LED forms a pixel of the LED display module 12.

The LED drivers 22 receive electrical power from the power converter 18 via one or more power wires or cables 16A for powering the LEDs 24. The LED drivers 22 also receive control signals from the central controller 20 via one or more signal wires or cables 16B for regulating the power delivered to the LEDs 24, thereby controlling the lighting of each LED 24 (for example, off, on, lighting intensity, color, and/or the like) for controlling the display of the LED signage 10. Depending on the driving capacity of the LED drivers 22, each LED driver 22 may be electrically connected to and may regulate a subset of the LEDs 24 for example 4, 8, or 16 LEDs 24.

As described before, the power converter 18 is located in the cabinet 14, and is physically separated from the LED display module 14 but electrically connected thereto via the electrical cables 16A and 16B. The power converter 18 comprises an AC/DC converter 26 and a DC/DC converter 28. The AC/DC converter 26 converts the AC electrical power from an external power source 30 into high-voltage DC power and outputs the converted high-voltage DC power to the DC/DC converter 28. The DC/DC converter 28 converts the high-voltage DC power received from the AC/DC converter 26 into low-voltage DC power (for example, at about 5V, 7.5V, or the like) suitable for powering the LEDs 24 in the LED display module 12, and outputs the low-voltage DC power to the LED display module 12 via the cable 16A. Therefore, existing LED signage displays 10 have a low-voltage power distribution (for example, 5V) to their LED display modules 12.

As described above, each LED driver 22 is electrically connected to the central controller 20 via the cable 16B. The central controller 20 is functionally connected to one or more computing devices 32 such as a desktop computer, a laptop computer, a smartphone, a tablet, a personal digital assistant (PDA), and the like, via suitable wired or wireless connection for receiving instructions therefrom. In response to the received instructions, the central controller 20 sends control signals to the LED drivers 22 to regulates the power delivered to the LEDs 24 of the LED display module 12, thereby controlling the lighting (for example, off, on, the lighting intensity, color, and the like) of each LED 24 thereof for controlling the display of the LED signage 10.

FIG. 2B is a circuit diagram showing an LED driver 22 driving a plurality of LEDs 24 in the LED display module 12. For ease of illustration, FIG. 2B only shows three LEDs 24 emitting red, green, and blue lights, respectively, and forming a pixel of the LED display module 12.

As shown, each LED 24 is electrically connected in series to a resister R and a switch 34 such as a semiconductor switch and, for example, a metal-oxide semiconductor field-effect transistor (MOSFET) switch. The LED driver 22 receives control signals from the central controller (not shown in FIG. 2B) via a wired data bus 38, and individually controls each switch 34 via an electrical wire 40 to: (i) turn the respective LED 24 on and off, and (ii) control the luminous intensity thereof.

The LED driver 22 uses a Pulse-Width Modulation (PWM) scheme to turn the respective switch 34 on and off at a sufficiently high frequency for controlling the electrical current flowing through each LED 24. In particular, the LED driver 22 adjusts the duty cycle of the pulse-width modulated current to control the luminous intensity of each LED 24 thereby controlling the luminous intensity thereof. By increasing the duration of the duty cycle, the duration of time that the switch 34 is turned on is increased and thus the current flowing therethrough becomes larger, thereby making the LED 24 brighter. By controlling the luminous intensity of the light emitted from each of the red, green, and blue LED 24 in a pixel in response to a set of control signals sent to the LED driver 22 via the data bus 38, the color of the pixel may be dynamically adjusted for displaying an image on the LED display module 12. FIG. 2C shows a prior-art LED driver 22 disclosed in U.S. Pat. No. 6,586,890 to Min, et al.

There are several challenges and difficulties associated with the prior-art digital LED signage displays. For example, due to the fact that a low DC voltage is distributed from the power converter 18 to the LED display module 12, the electrical current in the power cable 16A (see FIG. 2A) and in other wiring of the LED signage display 10 is significantly large (as the power consumption of the LED signage display 10 is constant), thereby causing substantial amounts of energy losses in the form of heat. Therefore, a prior-art digital LED signage display usually requires multiple fans and/or large heat-sinks for heat dissipation, and consequently requires an effective thermal management system. The large amount of generated heat is also a risk to safety and reliable operation of digital LED signage displays.

Moreover, using fans or rotational parts for the digital LED signage display significantly reduces its reliability since the rotational parts are usually the points of failure in these products.

As each LED driver 22 is connected to the central controller 20 via the cable 16B (for example, a ribbon cable), a large digital LED signage display 10 generally requires one or more ribbon cables 16B having a large number of wires therein, which makes the digital LED signage display 10 expensive and unreliable since there is a high risk that the wires in ribbon cables may get disconnected and/or damaged over time, particularly in outdoor applications.

In addition, prior-art LED drivers are not able to smoothly modulate the current flowing through the LEDs thereby decreasing the quality of images displayed on the LED signage during color transitions.

SUMMARY

Herein, a Light-Emitting Diode (LED) apparatus is disclosed. The LED apparatus comprises a direct-current (DC) power supply outputting DC power at a first voltage, and an LED module physically separated from the DC power supply and electrically connected to thereto via one or more cables for receiving DC power output therefrom. The LED module comprises a plurality of LED submodules. Each LED submodule comprises and integrates therein (i) one or more LEDs and (ii) a DC/DC converter electrically connected to the DC power supply via the one or more cable and connected to the one or more LEDs in the LED submodule. The DC/DC converter converts the DC power output from the DC power supply to a DC power at a second voltage lower than the first voltage, and individually outputs the DC power at a second voltage (for example, via an individual power wire) to each of the one or more LEDs in the submodule.

In some embodiments, each LED submodule also comprises a wireless communication unit for receiving control signals, and a control unit for controlling the LEDs via the DC/DC converter, based on the control signals received by the wireless communication unit.

According to one aspect of this disclosure, there is provided a LED apparatus. The LED apparatus comprises: a power source outputting a source direct-current (DC) power at a source DC voltage; and an LED module physically separated from the power source and comprising one or more LED submodules, each LED submodule comprising therein a DC-to-DC (DC/DC) converter electrically coupled to a plurality of LEDs drivable by a driving DC power at a driving DC voltage lower than the source DC voltage. The DC/DC converter of each LED submodule is also electrically coupled to the power source via one or more cables and is configured for converting the source DC power to the driving DC power at the driving DC voltage for driving the plurality of LEDs of the LED submodule.

In some embodiments, the source DC voltage is higher than 12V.

In some embodiments, the source DC voltage is about 48V.

In some embodiments, the DC/DC converter in each LED submodule individually outputs the driving DC power to each of the plurality of LEDs in the LED submodule.

In some embodiments, the LED apparatus further comprises a gateway for wirelessly communicating with a computing device. Each LED submodule further comprises a wireless communication unit configured for wireless communicating with the gateway. The gateway is configured for wirelessly receiving from the computing device a command for controlling the LED apparatus and in response, wirelessly communicating with the wireless communication unit of each LED submodule for controlling the lighting of the plurality of LEDs in the LED submodule.

In some embodiments, each LED submodule further comprises a control unit in signal communication with the wireless communication unit and is configured for controlling the lighting of the plurality of LEDs in the LED submodule.

In some embodiments, the control unit in each LED submodule is configured for individually controlling the lighting of each of the plurality of LEDs in the LED submodule.

In some embodiments, the power source may comprise at least an alternate-current (AC) to alternate-current (AC/DC) converter electrically connectable to an AC power source.

In some embodiments, the power source may comprise at least a combination of a solar panel and an energy storage unit.

In some embodiments, the power source is switchable between at least an AC/DC converter electrically connectable to an AC power source and a combination of a solar panel and an energy storage unit.

According to one aspect of this disclosure, there is provided a LED apparatus. The LED apparatus comprises: a power source outputting a source DC power at a source DC voltage; a plurality of LEDs drivable at a driving DC voltage lower than the source DC voltage; and an electrical path connecting the power source to each LED for powering the LED by the power source. Each electrical path comprises a first portion connected to the power source at the source DC voltage and a second portion connected to the LED at the driving DC voltage, wherein the length of the first portion is longer than that of the second portion.

In some embodiments, the source voltage is higher than 12V.

In some embodiments, the source voltage is about 48V.

In some embodiments, the LED apparatus further comprises: one or more DC/DC convertors coupled to the electrical paths between the major and minor portions thereof for converting the source DC voltage to the driving DC voltage.

In some embodiments, each LED is individually powered by an output of the one or more DC/DC convertors.

In some embodiments, the LED apparatus further comprises: a gateway for wirelessly communicating with a computing device; and one or more wireless communication units coupled to the plurality of LEDs and configured for wireless communicating with the gateway. The gateway is configured for wirelessly receiving from the computing device a command for controlling the LED apparatus and in response, wirelessly communicating with the one or more wireless communication units for controlling the lighting of the plurality of LEDs.

In some embodiments, the one or more wireless communication units are coupled to the plurality of LEDs through one or more control units; and the one or more control units are configured for controlling the lighting of the plurality of LEDs in response to the signal received from the one or more wireless communication units.

In some embodiments, the LED apparatus further comprises: one or more control units in signal communication with the one or more wireless communication units and configured for individually controlling the lighting of each of the plurality of LEDs.

In some embodiments, the power source comprises at least an alternate-current (AC) to alternate-current (AC/DC) converter electrically connectable to an AC power source.

In some embodiments, the power source comprises at least a combination of a solar panel and an energy storage unit.

In some embodiments, the power source is switchable between at least an AC/DC converter electrically connectable to an AC power source and a combination of a solar panel and an energy storage unit.

According to one aspect of this disclosure, there is provided a method of powering an LED module comprising a plurality of LEDs drivable at a driving DC voltage. The method comprises: providing a power source outputting a source DC power at a source DC voltage higher than the driving DC voltage; and establishing a plurality of electrical paths, each electrical path connecting the power source to one of the plurality of LEDs for powering the LED by the power source. Each electrical path comprises a major portion connected to the power source at the source DC voltage and a minor portion connected to the LED at the driving DC voltage.

In some embodiments, the source voltage is higher than 12V.

In some embodiments, the source voltage is about 48V.

In some embodiments, said establishing the plurality of electrical paths comprises: converting the source DC voltage to the driving DC voltage at locations between the major and minor portions of the plurality of electrical paths by using one or more DC/DC convertors.

In some embodiments, said establishing the plurality of electrical paths further comprises: individually powering each LED by an output of the one or more DC/DC convertors.

In some embodiments, the method further comprises: wirelessly commanding the plurality of LEDs for controlling the lighting of the plurality of LEDs.

In some embodiments, said wirelessly commanding the plurality of LEDs comprises: wirelessly commanding one or more wireless communication units to send control signals to the plurality of LEDs through one or more control units for controlling the lighting of the plurality of LEDs.

In some embodiments, said wirelessly commanding the plurality of LEDs further comprises: individually controlling the lighting of each of the plurality of LEDs in response to said commanding.

In some embodiments, the power source comprises at least an alternate-current (AC) to alternate-current (AC/DC) converter electrically connectable to an AC power source.

In some embodiments, the power source comprises at least a combination of a solar panel and an energy storage unit.

In some embodiments, the power source is switchable between at least an AC/DC converter electrically connectable to an AC power source and a combination of a solar panel and an energy storage unit.

BRIEF DESCRIPTION OF THE DRAWINGS

The embodiments of the present disclosure will now be described with reference to the following figures in which identical reference numerals in different figures indicate identical elements, and in which:

FIG. 4 is a simplified schematic diagram of an advanced LED display module of the digital LED signage shown in FIG. 3;

DETAILED DESCRIPTION

The present disclosure generally relates to a LED apparatus. In some embodiments disclosed herein, the LED apparatus may be a digital LED signage. The LED apparatus disclosed herein comprises a power and control architecture based on an integrated solution distributed along the apparatus. The integrated solution offers a highly efficient and compact solution for the LED apparatus, and has advantages such as higher efficiency, compactness, less wiring, simpler heat removal, and no rotational components (i.e., the disclosed LED apparatus is fan-less). The power and control architectures disclosed herein enable the LED apparatus to achieve improved performance for each individual LED, leading to a highly energy-efficient product.

Figure 3:
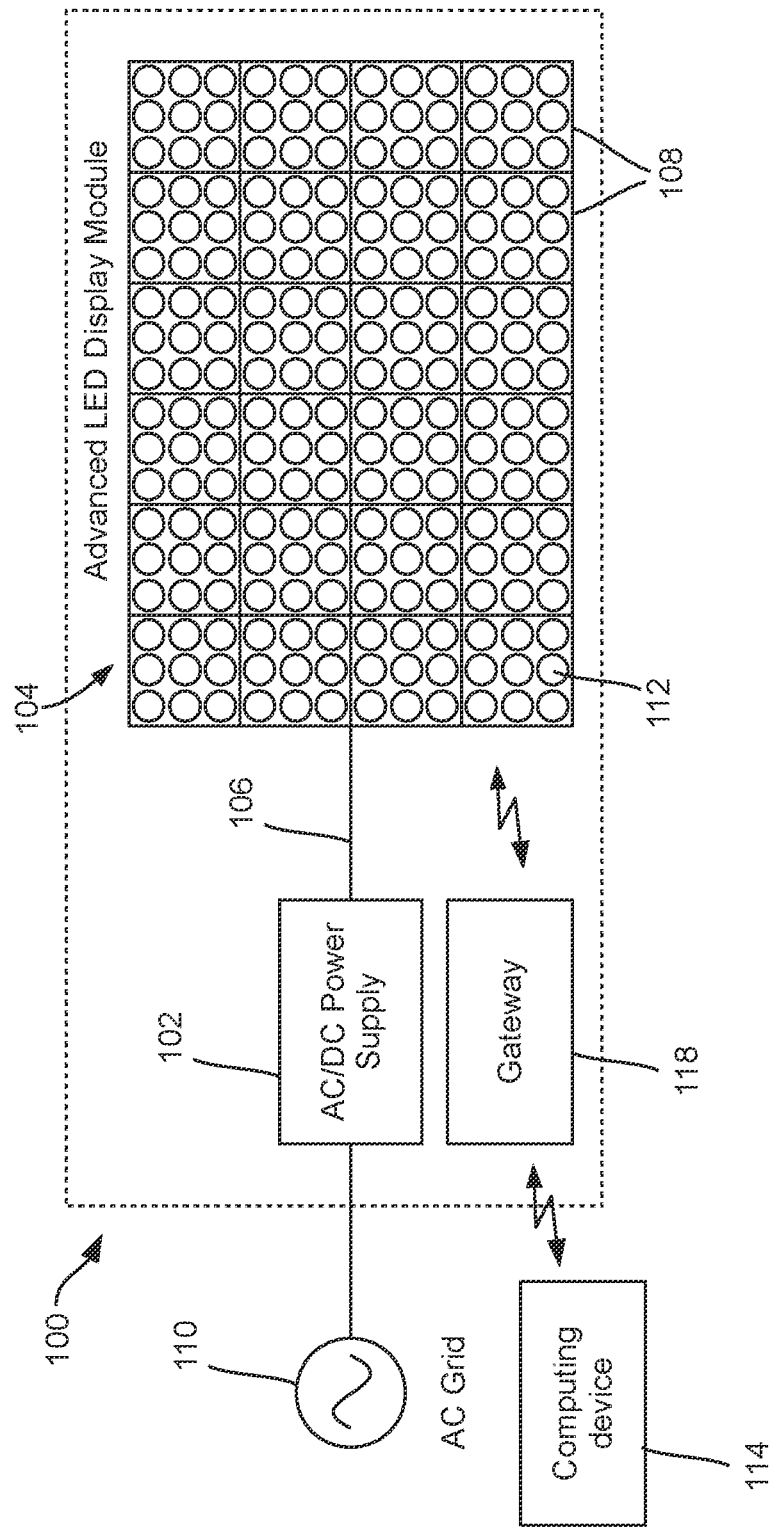
FIG. 3 is a simplified schematic block diagram of a digital LED signage according to an embodiment of this disclosure.

Turning now to FIG. 3, an LED apparatus in the form of a digital LED signage display is shown and is generally identified using reference numeral 100. As shown, the digital LED signage display 100 comprises an advanced LED display module 104 formed by a plurality of LED display submodules 108. Each LED display submodule 108 comprises a plurality of LEDs 112 drivable at a driving DC voltage such as 5V, 7.5V, 12V, or the like, depending on the implementation.

The digital LED signage display 100 also comprises a power source or power supply 102 in the form of an AC/DC power converter in electrical connection with the LED display submodules 108 of the advanced LED display module 104, and a gateway 118 in wireless communication with the LED display submodules 108 of the LED display module 104.

The AC/DC power supply 102 may be mounted at a suitable location of the digital LED signage display 100 such as in a housing thereof and is physically separated from the advanced LED display module 104. The AC/DC power supply 102 converts the electrical power of an external AC power source 110 (such as an AC power grid) into a source DC power at a source DC voltage and outputs the source DC power to the LED display submodules 108 (and in particular to an LED power Integrated Circuit (IC) chip 142 thereof; described in more detail later) via a power cable 106 for powering the LEDs 112. The source DC voltage is generally higher than the driving DC voltage of the LEDs 112. In some embodiments, the source DC voltage of the AC/DC power supply 102 is higher than 7.5V. In some embodiments, the source DC voltage of the AC/DC power supply 102 is higher than 12V. In some embodiments, the source DC voltage of the AC/DC power supply 102 is about 48V.

The AC/DC power supply 102 outputs a higher source DC voltage compared to the prior-art, low-voltage power distribution LED signage displays. Therefore, the electrical current passing through the power cable 106 and consequently the energy loss on the power cable 106 and heat generated therefrom are substantially smaller than that of the prior-art designs that have similar constant power consumption. Furthermore, the high-voltage distribution (for example, 48V) significantly facilitates the integration of solar energy and energy storage (batteries) into the digital LED signage display 100. In comparison, the prior-art designs require multiple power conversion components to implement solar energy and energy storage integration.

Referring again to FIG. 3, the gateway 118 is configured for wirelessly communicating with the LED display submodules 108 (and in particular a wireless communication unit 144 thereof shown in FIGS. 5A, 5B and described in more detail later) and with an external computing device 114 such as a desktop computer, a laptop computer, a smartphone, a tablet, or the like. Therefore, a user (not shown) of the computing device 114 may initiate a command for controlling the LED signage display 100 that is sent wirelessly to the gateway 118. In response to the command, the gateway 118 then wirelessly communicates with the LED submodules 108 to adjust the lighting of the LEDs 112 thereof.

In various embodiments, the wireless connection between the gateway 118 and the LED submodules 108 and/or the wireless connection between the gateway 118 and the external computing device 114 may be any suitable wireless communication technologies such as WI-FI®, (WI-FI is a registered trademark of the City of Atlanta DBA Hartsfield-Jackson Atlanta International Airport Municipal Corp., Atlanta, Ga., USA), BLUETOOTH® (BLUETOOTH is a registered trademark of Bluetooth Sig Inc., Kirkland, Wash., USA), ZIGBEE® (ZIGBEE is a registered trademark of ZigBee Alliance Corp., San Ramon, Calif., USA), wireless mobile telecommunications technologies (such as GSM, CDMA, LTE, and the like), and/or the like.

FIG. 4 is a schematic diagram of the advanced LED display module 104. As described above, the advanced LED display module 104 comprises a plurality of LED submodules 108 wherein the LED submodule 108A at the upper-right corner thereof is shown separated from other LED submodules 108 for clearer illustration of submodule. Each LED submodule 108 (including submodule 108A) comprises one or more LEDs 112.

In the example shown in FIG. 4, the advanced LED display module 104 comprises twenty four (24) LED submodules 108 arranged as a 4-by-6 matrix. Of course, in other embodiments, the LED module 104 may comprise different numbers of LED submodules 108, and the LED submodules 108 may be arranged in different configurations for example, in different numbers of rows and columns and/or in different layouts such as triangles, circles, and the like.

In the example shown in FIG. 4, each LED submodule 108 preferably comprises nine (9) LEDs 112 arranged in a 3-by-3 matrix which is optimal for this example of an integrated solution based on Applicant's power-loss calculation. However, in other embodiments, an LED submodule 108 may comprise different numbers of LEDs 112, and the LEDs 112 may be arranged in different configurations such as in different numbers of rows and columns, and/or in different layouts such as triangles, circles, and the like.

Figure 5A:
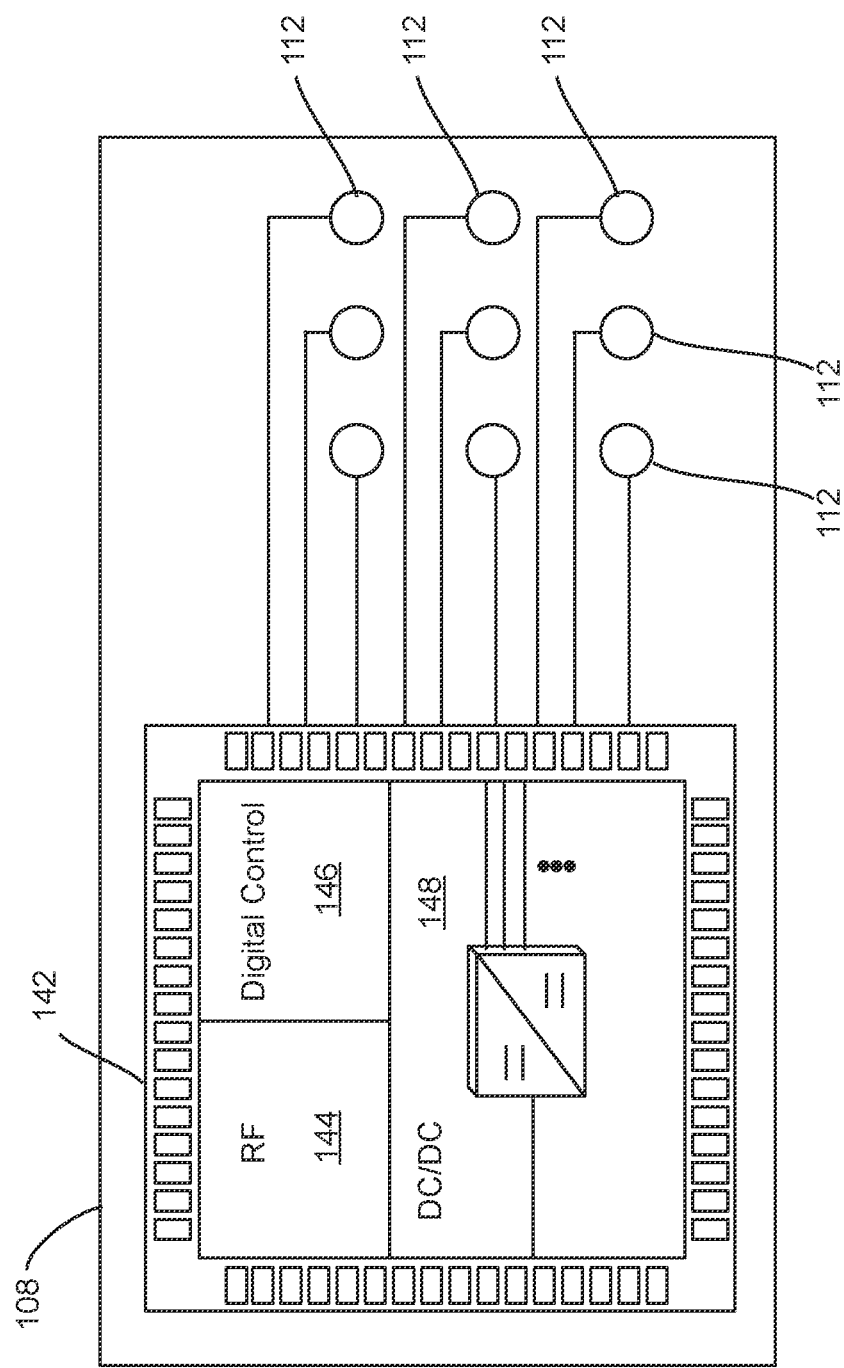
FIGS. 5A and 5B are simplified block diagrams of a LED submodule of the advanced LED display module shown in FIG. 4.
Figure 5B:
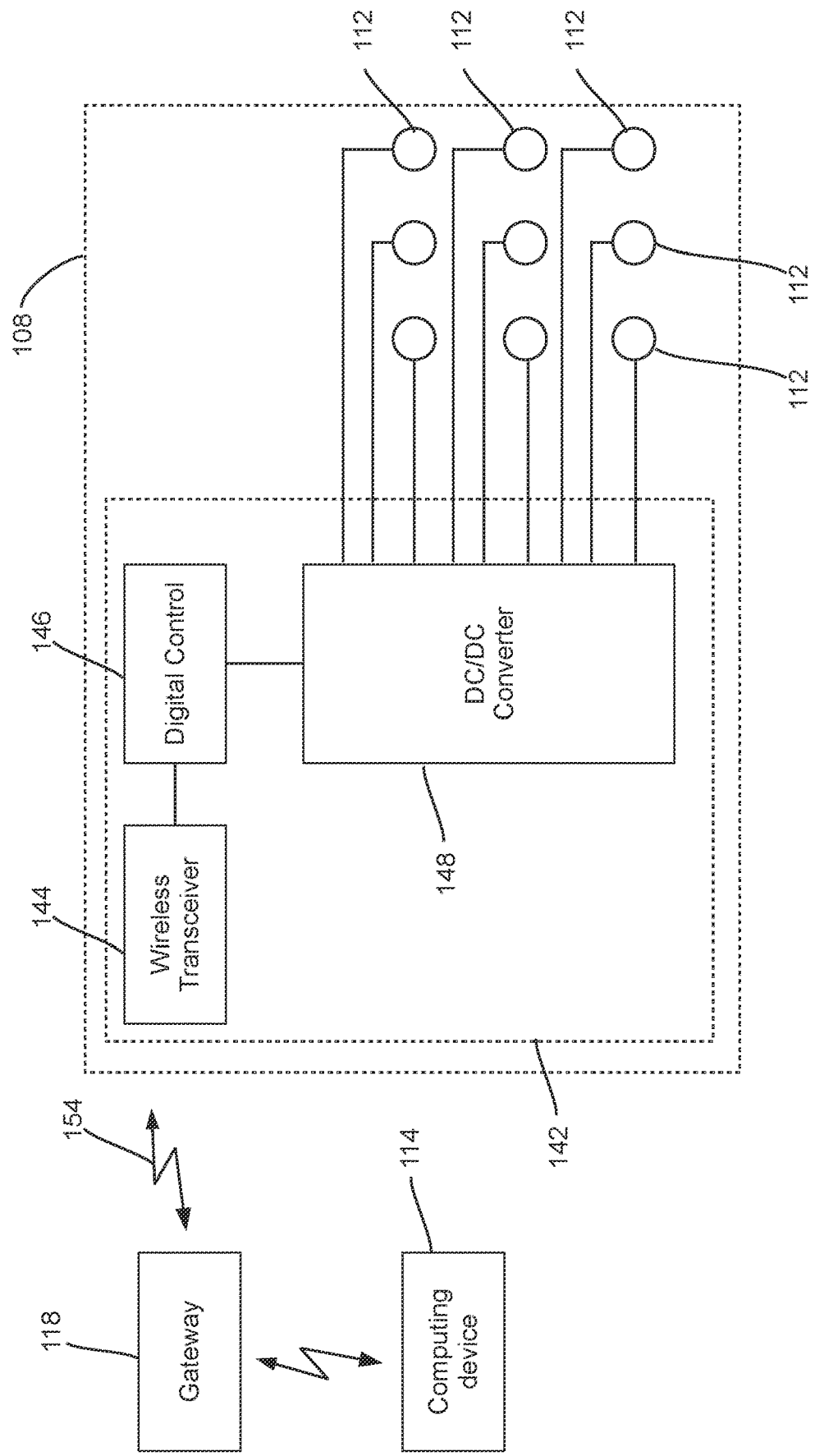

FIGS. 5A and 5B are simplified block diagrams of an LED submodule 108. As shown, the LED submodule 108 comprises and integrates therein one or more LEDs 112 and an LED power Integrated Circuit (IC) chip 142 that provides a multi-functional, integrated solution for individually powering and controlling each LED 112 of the LED submodule 108 (for example, via an individual power wire and an individual signal wire). The LED power IC 142 may comprise a wireless communication unit 144 such as a radio frequency (RF) wireless transceiver, a digital control unit 146, and a multi-output DC/DC converter 148.

The wireless communication unit 144 is in signal communication with the digital control unit 146 and is in wireless communication with the gateway 118 for wirelessly receiving the control information such as color, light intensity, and the like from the gateway 118 (or a central controller) of the digital signage 100. In this embodiment, the gateway 118 is physically separated from the advanced LED display module 104. In response to instructions received from one or more computing devices 114, the gateway 118 communicates with the wireless communication unit 144 of the LED Power IC 142 of each LED submodule 108 via a wireless communication connection 154 for controlling the corresponding LEDs 112 in the LED submodule 108. The wireless communication unit 144 also reports the status of each LED 112 in the LED submodule 108 for diagnosis and troubleshooting purposes. The wireless communication unit 144 thus eliminates the need of control-wires required in conventional designs.

Figure 2A:
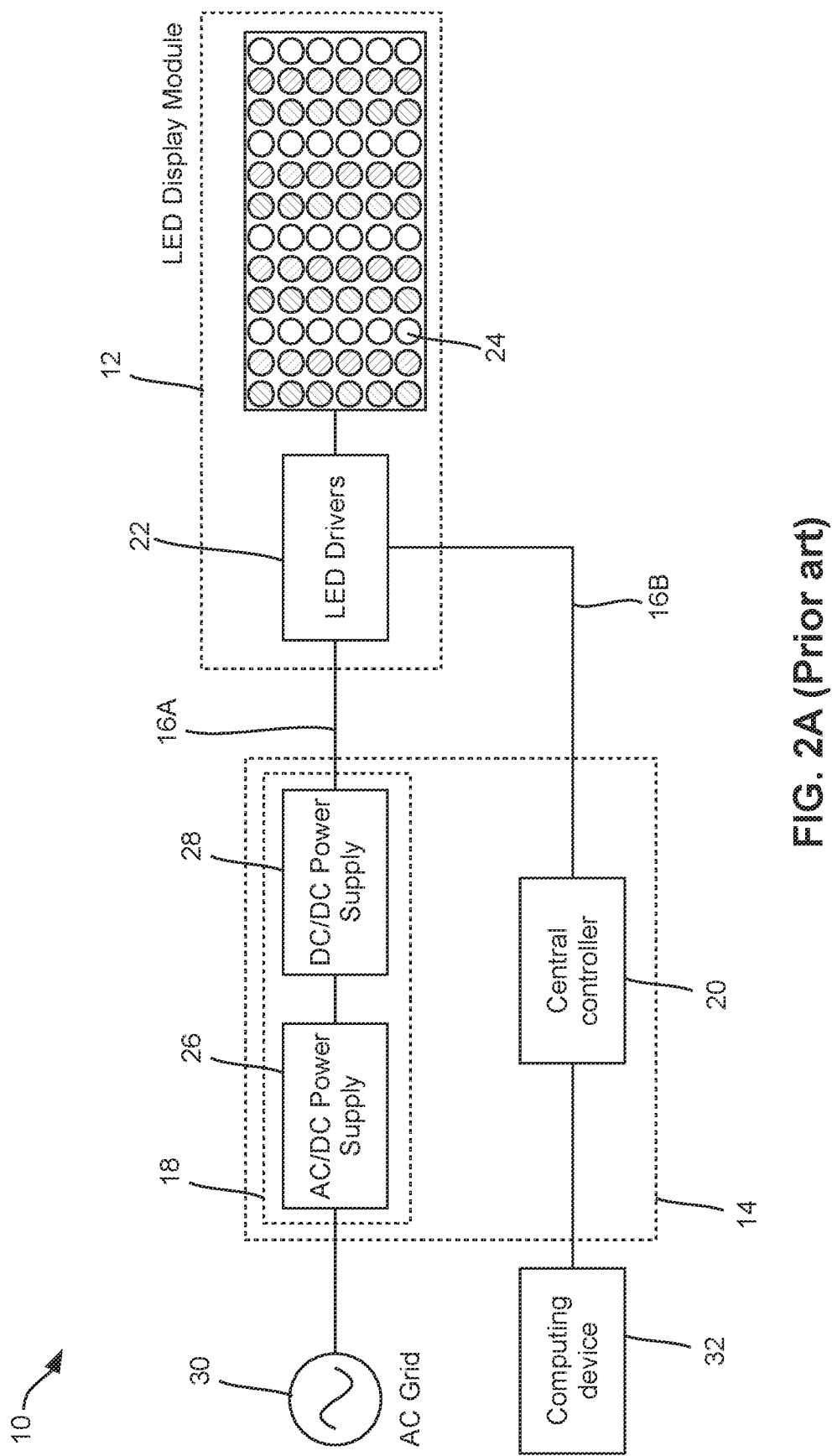
FIG. 2A is a schematic block diagram of the prior-art digital LED signage display shown in FIG. 1.

The digital control unit 146 provides control signals for the multi-output DC/DC converter 148. It also receives the high-level signals from the wireless communication unit 144, then decodes the information therein and finally, produces appropriate gate signals for the digital switches/MOSFETs (similar to the digital switches 34 of FIG. 2A) of the multi-output DC/DC converter 148. The digital control units 146 play a pivotal role in system optimization, diagnosis, and reliability of the advanced LED display module 104. Each digital control unit 146 provides substantial flexibility to control LEDs 112 of the respective LED submodule 108 in an optimized manner, updates the required information through the wireless communication unit 144, and receives system updates.

Figure 6:
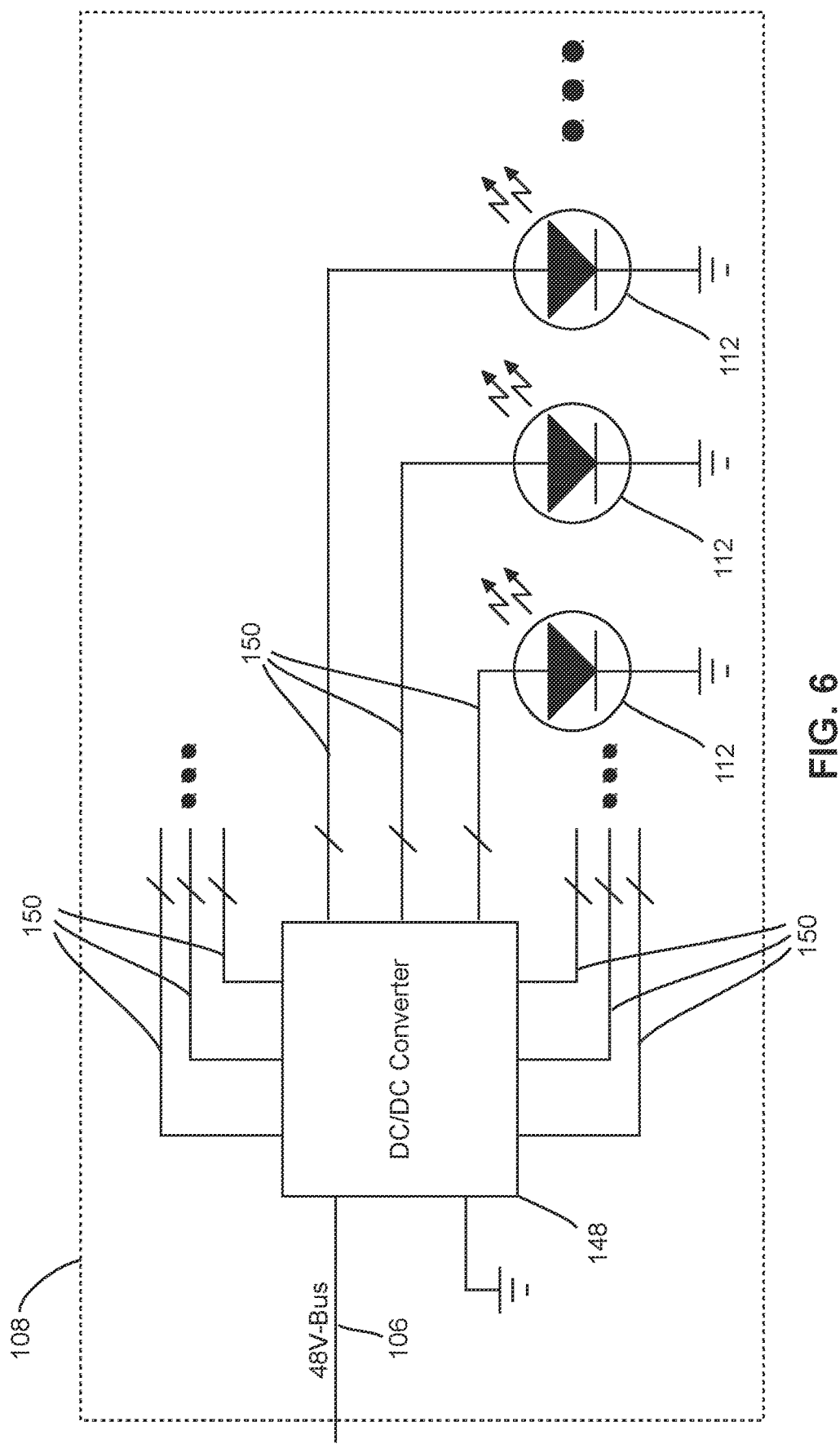
FIG. 6 is a simplified circuit diagram of the power architecture of the LED submodule shown in FIG. 5A.

FIG. 6 is a simplified circuit diagram of the power architecture of the LED power IC 142, showing the multi-output DC/DC converter 148 of the LED power IC 142 driving the LEDs 112. As shown, the DC/DC converter 148 of the LED power IC 142 receives the high-voltage DC power from the AC/DC power supply 102 via the power cable 106, converts the high-voltage power to suitable low-voltage DC power such as 5V or 12V DC power depending on the implementation, and independently outputs the low-voltage DC power via an electrical wire or conductor 150 to each LED 112 of the LED submodule 108. As the DC/DC converter 148 is physically in the LED submodule 108, the length of each electrical wire or conductor 150 is much shorter than that of the power cable 106.

With above design, a major portion of the electrical path from the AC/DC power supply 102 to each LED 112 of the advanced LED display module 104 is a high-voltage, small-current path. Subsequently, the energy losses in the form of heat through the electrical path are significantly reduced.

Moreover, each multi-output DC/DC converter 148 can independently and precisely control the LEDs 112 in the respective submodule 108 by independently and precisely controlling the current of each output 150. As a result, the light intensity of each LED 112 may be smoothly modulated for smooth dimming. The DC/DC converter 148 altogether eliminates the need for series resistors and drivers to perform dimming.

The control on the voltage across each LED 112 and current therethrough provides substantial flexibility to optimize the operation of the LEDs 112 and offers higher overall efficiency of the digital LED signage 100. In addition, the DC/DC converter 148 is able to smoothly modulate its output currents by ramping up and down the corresponding output voltages. On the other hand, the PWM signals and the LED drivers of the prior-art LED signage displays instantaneously apply the low-voltage power on LEDs, which creates significant amounts of Electro Magnetic Interference (EMI) and switching losses. By using a tight closed-loop control on the output currents of each multi-output DC/DC converter 148, the output currents thereof can be smoothly modulated. The EMI issues and switching losses are thus eliminated or at least significantly reduced.

Figure 1:
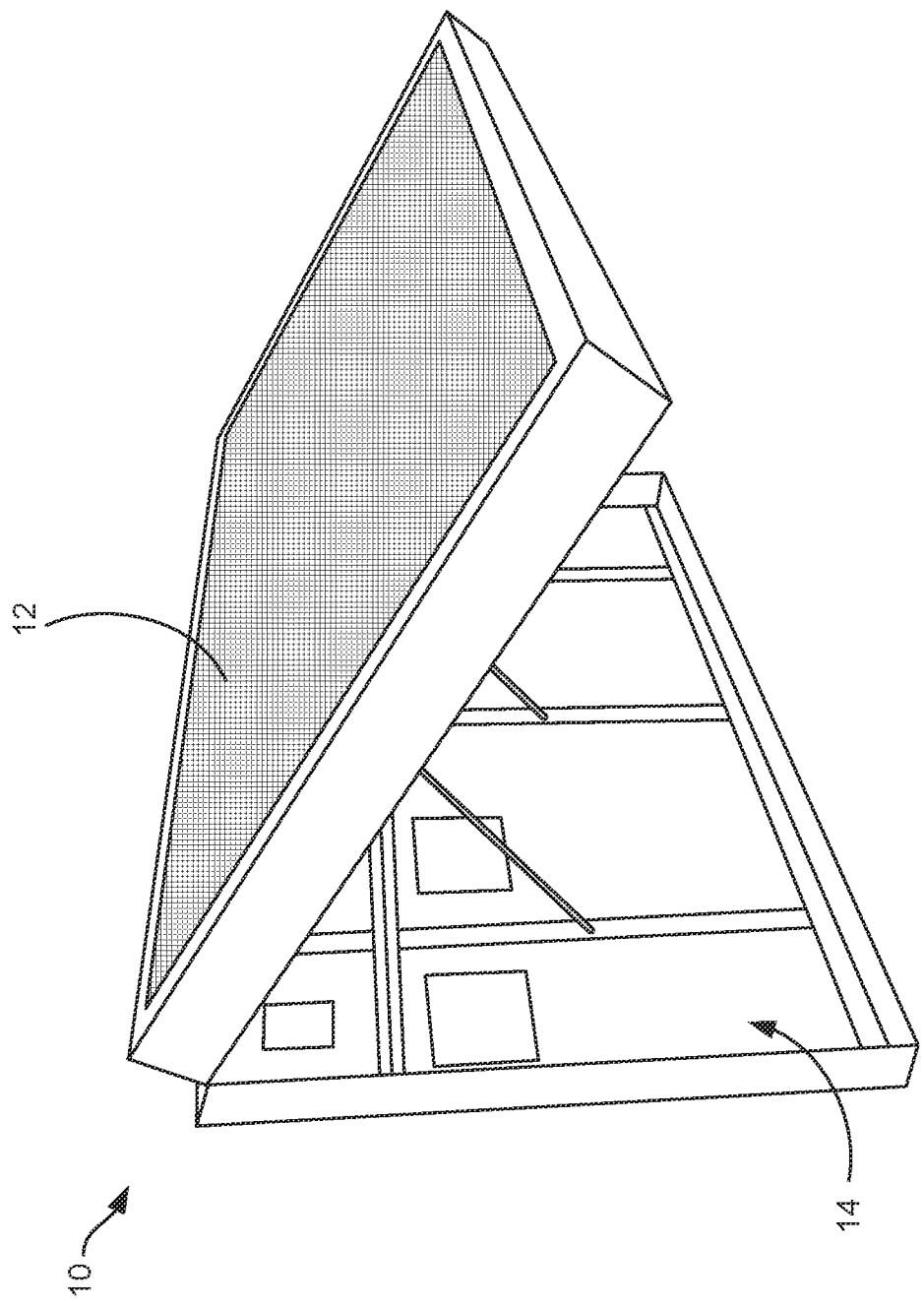
FIG. 1 is a perspective view of a prior-art LED signage display.
Figure 2B:
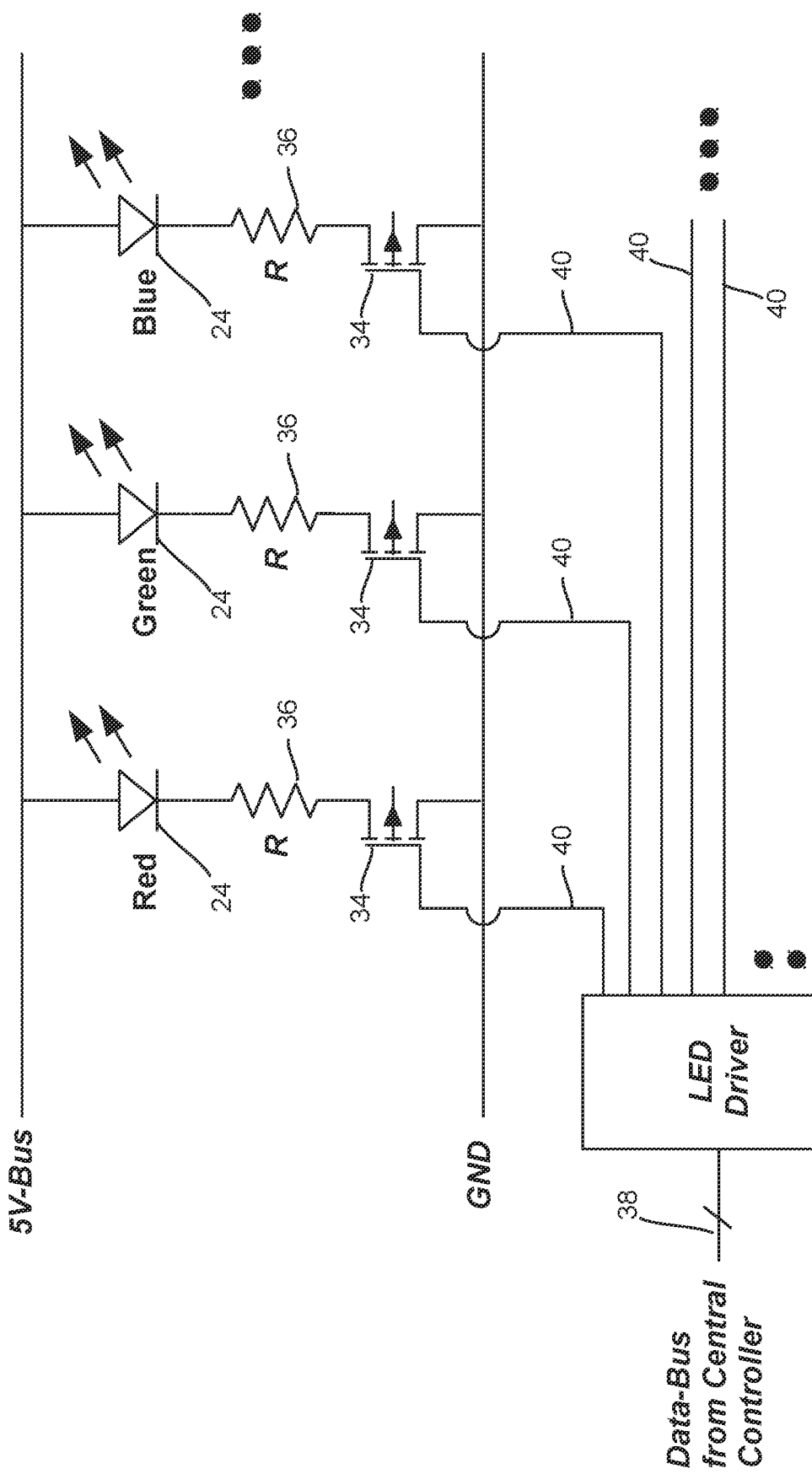
FIG. 2B is a circuit diagram showing a prior-art LED driver of the digital LED signage display shown in FIG. 1, driving a plurality of LEDs.
Figure 2C:
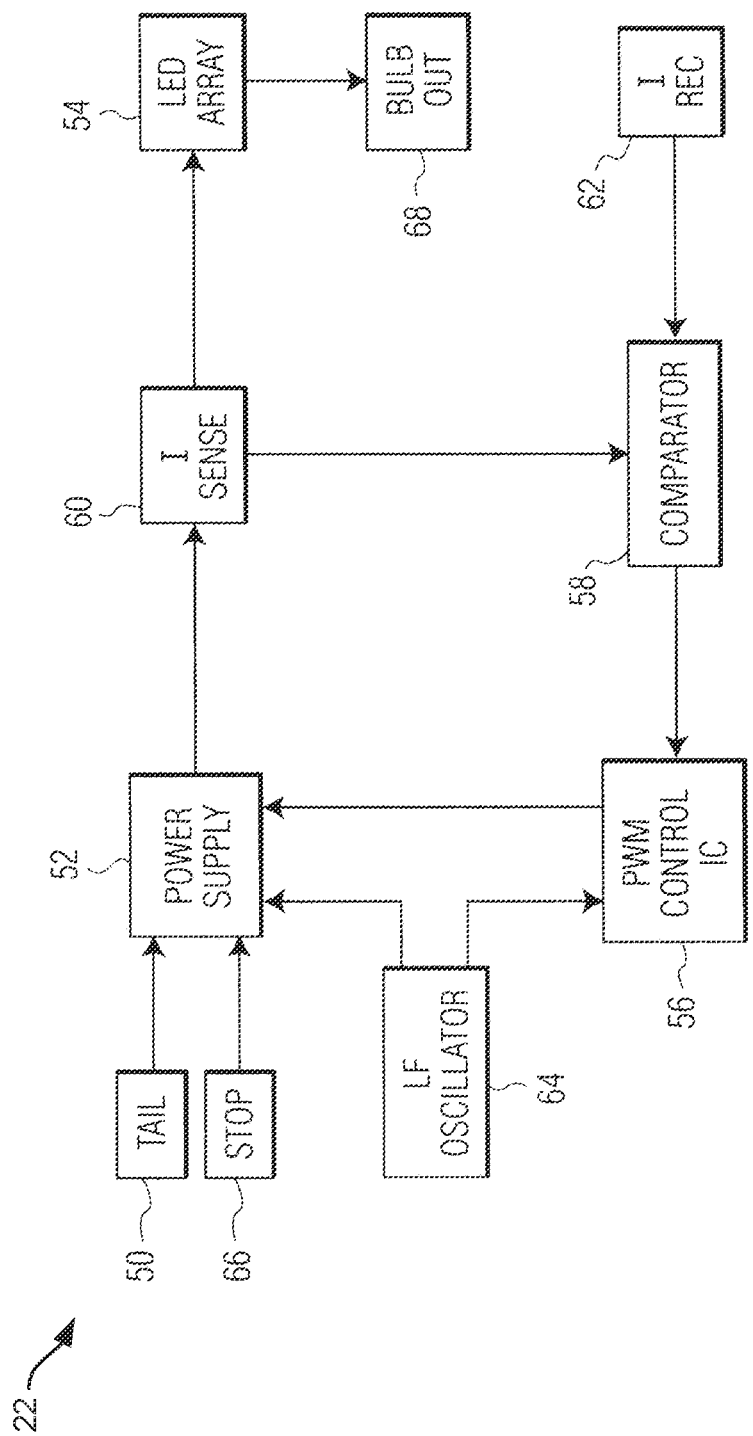
FIG. 2C is a schematic diagram of another prior-art LED driver of the digital LED signage display shown in FIG. 1.

In the prior-art design as shown in FIGS. 1 to 2C, one or more power cables 16A are required for electrical connection between the power converter 18 and each LED driver 22 of the LED display module 12 for powering the LEDs 24. One or more control cables 16B, for example, in the form of ribbon cables, are also required for electrical connection between the central controller 20 and each LED driver 22 of the LED display module 12 for transmission of control signals.

On the other hand, the digital LED signage 100 disclosed herein only requires a power cable 106 with each wire therein connecting the AC/DC power supply 102 to a respective LED submodule 108 (in particular, to the DC/DC converter 148 of the LED power IC 142 of the LED submodule 108). The digital LED signage 100 does not require any control wires because the control signals are transmitted to the LED submodule 108 wirelessly. Therefore, the digital LED signage 100 and its LED power/lighting management comprise a significantly reduced number of wires thereby reducing the risk of lighting malfunctions caused by broken wires in the cable 106, reducing the cost of manufacturing for digital LED signage 100, and simplifying the diagnoses and repairs in the event that any wires in the cable 106 are broken.

Figure 7:
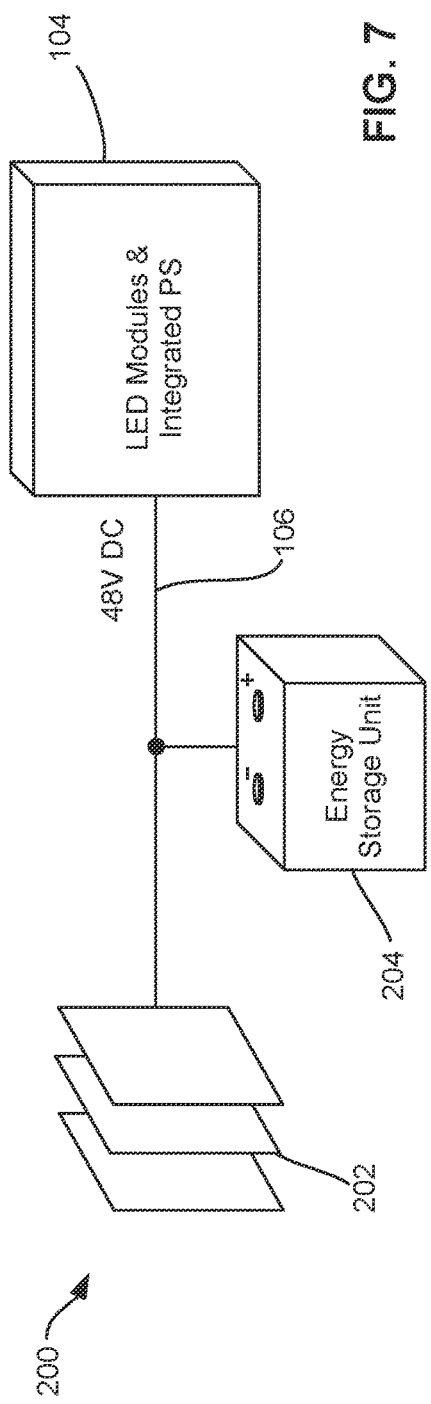
FIG. 7 is a simplified schematic block diagram of a digital LED signage powered by solar energy and stored energy according to an alternative embodiment of this disclosure.

In above embodiments, the digital LED signage 100 comprises an AC/DC power supply 102. In an alternative embodiment as shown in FIG. 7, the digital LED signage 200 may comprise a solar panel 202 having a high-voltage DC output such as a 48V DC output and in electrical connection with an advanced LED display module 104 and an energy-storage unit 204 such as a rechargeable battery pack for powering the advanced LED display module 104 and for charging the energy-storage unit 204. As those skilled in the art will appreciate, the energy-storage unit 204 may also output a high-voltage DC power to the advanced LED display module 104. Therefore, the combination of the solar panel 202 and the energy storage unit 204 is equivalent to the power supply 102 shown in FIG. 3.

Figure 8:
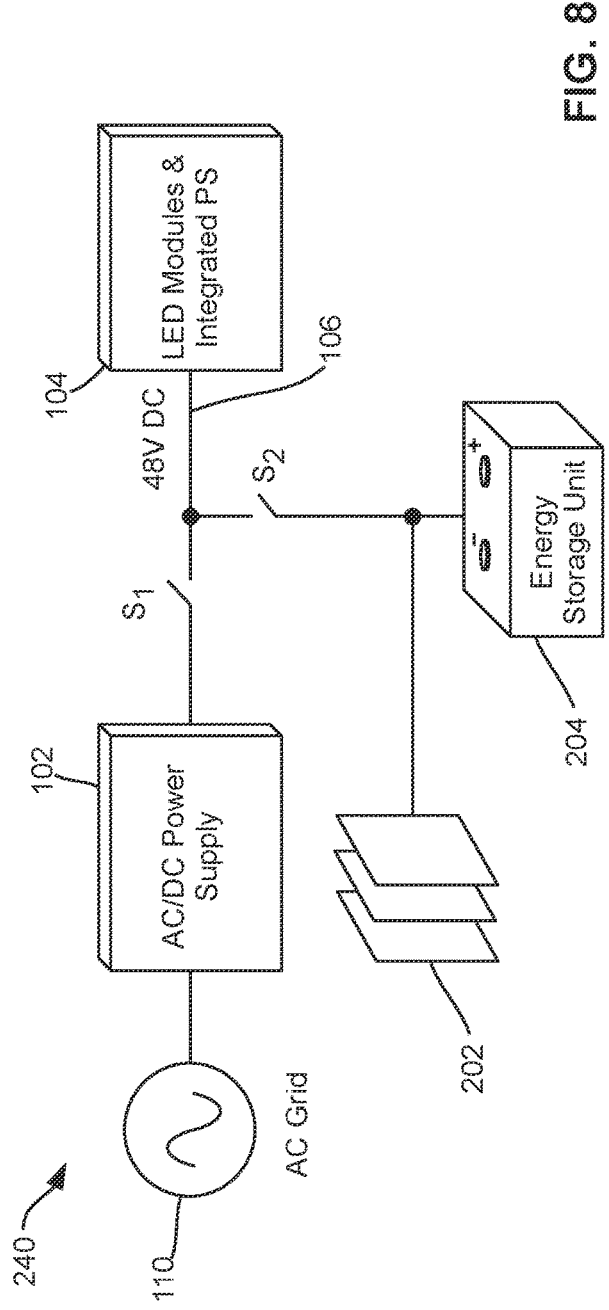
FIG. 8 is a simplified schematic block diagram of a digital LED signage with integration of solar energy and energy storage, according to an alternative embodiment of this disclosure.

FIG. 8 shows a simplified block diagram of a digital LED signage 240 according to another embodiment of the present disclosure. The digital LED signage 240 in this embodiment comprises an advanced LED display module 104 selectively coupled to an AC/DC power supply 102 in the form of an AC/DC power converter electrically connectable to an AC power source, and a solar panel 202 having an energy storage unit 204 such as a rechargeable battery pack via switches $S_1$ and $S_2$. In other words, the power source of the advanced LED display module 104 is switchable between at least the AC/DC converter 102 and a combination of a solar panel and an energy storage unit via switches $S_1$ and $S_2$.

The AC/DC power supply 102 receives AC power from an AC grid 110 and converts the AC power of the AC grid 110 to a high-voltage DC power such as a 48V DC power for selectively outputting the DC power to the advanced LED display module 104 when the switch $S_1$ is closed and the switch $S_2$ is open.

The solar panel 202 has a high-voltage DC power output such as a 48V DC power output and is in electrical connection with the energy-storage unit 204 for charging the energy-storage unit 204. When the switch $S_1$ is open and the switch $S_2$ is closed, both the solar panel 202 and the energy-storage unit 204 are electrically connected to the advanced LED display module 104 for selectively outputting the high-voltage DC power thereto. Therefore, the power supplied to the advanced LED display module 104 may be switched as needed between the AC grid 110 and the solar panel 202/energy-storage unit 204. For example, the advanced LED display module 104 may be powered by the solar panel 202/energy-storage unit 204 when the power output therefrom is sufficient, and may be powered by the AC grid 110 when the power output from the solar panel 202/energy-storage unit 204 is insufficient.

While in above embodiments, the power and control architecture is described for use in digital LED signage, those skilled in the art appreciate that in some alternative embodiments, the power and control architecture may be used in other types of LED devices, such as an LED lighting device having a plurality of LEDs.

Although in above embodiments, an LED display system having an LED signage display is disclosed, in some alternative embodiments, the LED signage display may be an LED lighting apparatus, which, rather than being used for displaying images, is used for lighting purposes. Correspondingly, the LED system in these embodiments is then an LED lighting system.

In above embodiments, the advanced LED display module 104 comprises a plurality of LED submodules 108, and each LED submodule 108 comprises a plurality of LEDs 112. In some embodiments, each LED submodule 108 may comprise only one LED 112. In some embodiments, the advanced LED display module 104 may comprise only one LED submodule 108.

In above embodiments, each DC/DC convertor 148 is physically integrated into the respective LED submodule 108. In some embodiments, at least some of the DC/DC convertors 148 are physically in proximity with the respective LED submodules 108. For example, in one embodiment, at least some of the DC/DC convertors 148 may be removably attached to the back of the respective LED submodules 108.

Although embodiments have been described above with reference to the accompanying drawings, those of skill in the art will appreciate that variations and modifications may be made without departing from the scope thereof as defined by the appended claims.

What is claimed is:

1. A circuit module physically separated from a power source, for electrically coupling to the power source and powering a plurality of direct-current (DC) lighting components, the power source outputting a source DC power at a source DC voltage, the plurality of DC lighting components drivable by a driving DC power at a driving DC voltage lower than the source DC voltage, the circuit module comprising:
   one or more circuit submodules, each circuit submodule comprising therein a DC-to-DC (DC/DC) converter for electrically coupling to the power source via one or more cables;
   the DC/DC converter comprising a plurality of outputs, each of the plurality of outputs electrically coupled to a respective one of the plurality of lighting components for converting the source DC power to the driving DC power at the driving DC voltage and smoothly modulating currents of the plurality of outputs for individually driving the lighting component.

2. The circuit module of claim 1, wherein the source DC voltage is higher than 12V.

3. The circuit module of claim 1 further comprising a gateway for wirelessly communicating with a computing device;
   wherein each circuit submodule further comprises a wireless communication unit configured for wireless communicating with the gateway; and
   wherein the gateway is configured for wirelessly receiving from the computing device a command and in response wirelessly communicating with the wireless communication unit of each circuit submodule for controlling the lighting of the lighting components coupled thereto.

4. The circuit module of claim 3, wherein each circuit submodule further comprises a control unit in signal communication with the wireless communication unit and configured for controlling the lighting of lighting components coupled thereto.

5. The circuit module of claim 1, wherein the DC/DC converter of each LED submodule is configured for using a closed-loop control to smoothly modulate the currents of the plurality of outputs thereof.

6. The circuit module of claim 1, wherein the DC/DC converter of each circuit submodule is configured for adjusting output voltages thereof to smoothly modulate the output currents thereof.

7. A lighting apparatus comprising:
   a plurality of lighting components drivable at a driving DC voltage; and
   an electrical path for connecting a power source to each lighting component for powering the lighting component by the power source;
   wherein each electrical path comprises a first portion for receiving from the power source a source DC power at a source DC voltage and a second portion, the second portion comprising a plurality of outputs, each of the plurality of outputs individually connecting to a respective one of the plurality of lighting components at the driving DC voltage;
   wherein the driving DC voltage is lower than the source DC voltage;
   wherein the length of the first portion is longer than that of the second portion; and
   wherein currents of the plurality of outputs are configured for being smoothly modulated.

8. The lighting apparatus of claim 7, wherein the source voltage is higher than 12V.

9. The lighting apparatus of claim 7 further comprising:
   one or more DC/DC convertors coupled to the electrical paths between the first portion and the second portion thereof for converting the source DC voltage to the driving DC voltage and smoothly modulating the currents of the plurality of outputs;
   wherein each lighting component is individually powered by an output of the one or more DC/DC convertors.

10. The lighting apparatus of claim 7 further comprising:
    a gateway for wirelessly communicating with a computing device; and
    one or more wireless communication units coupled to the plurality of lighting components and configured for wireless communicating with the gateway;
    wherein the gateway is configured for wirelessly receiving from the computing device a command and in response, wirelessly communicating with the one or more wireless communication units for controlling the lighting of the lighting components.

11. The lighting apparatus of claim 10 wherein the one or more wireless communication units are coupled to the plurality of lighting components through one or more control units; and wherein the one or more control units are configured for controlling the lighting of the plurality of lighting components in response to the signal received from the one or more wireless communication units.

12. The lighting apparatus of claim 7 further comprising at least an AC/DC converter for converting an AC power of the power source to the source DC power for inputting to the first portion of each electrical path.

13. The lighting apparatus of claim 7, wherein the plurality of outputs of the second portion are configured for being controlled by a closed-loop control to smoothly modulate the currents thereof.

14. The lighting apparatus of claim 7, wherein the currents of the plurality of outputs are configured for being smoothly modulated by adjusting output voltages of the plurality of outputs.

15. A method of powering a plurality of lighting components drivable at a driving DC voltage, the method comprising:
    establishing a plurality of electrical paths, each electrical path connecting a power source to one of the plurality of lighting components for powering the one of the plurality of lighting components by the power source;
    wherein each electrical path comprises a major portion receiving from the power source a source DC power at a source DC voltage higher than the driving DC voltage, and a minor portion, the minor portion comprising a plurality of outputs each individually connecting to a respective one of the plurality of lighting components at the driving DC voltage; and
    smoothly modulating currents of the plurality of outputs of the minor portions.

16. The method of claim 15, wherein said establishing the plurality of electrical paths comprises:
    converting the source DC voltage to the driving DC voltage at locations between the major and minor portions of the plurality of electrical paths by using one or more DC/DC convertors; and
    individually powering each lighting component by an output of the one or more DC/DC convertors.

17. The method of claim 15 further comprising:
    wirelessly commanding the plurality of lighting components for controlling the lighting of the plurality of lighting components.

18. The method of claim 17, wherein said wirelessly commanding the plurality of lighting components comprises:
    wirelessly commanding one or more wireless communication units to send control signals to the plurality of lighting components through one or more control units for controlling the lighting of the plurality of lighting components.

19. The method of claim 18, wherein said wirelessly commanding the plurality of lighting components further comprises:
    individually controlling the lighting of each of the plurality of lighting components in response to said commanding.

20. The method of claim 15, wherein said smoothly modulating the currents of the plurality of outputs comprises:
    using a closed-loop control to smoothly modulate the currents of the plurality of outputs of the minor portions.

21. The method of claim 15, wherein said smoothly modulating the currents of the plurality of outputs of the minor portions comprises:
    smoothly modulating the currents of the plurality of outputs of the minor portions by adjusting output voltages of the plurality of outputs.

* * * * *